April 26, 1932.   F. M. POTTENGER, JR   1,855,647
SPRINKLING SYSTEM
Filed May 31, 1928
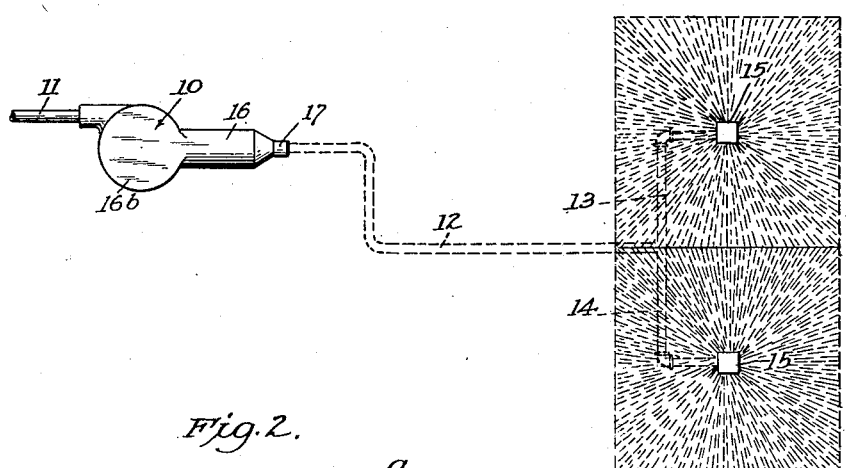
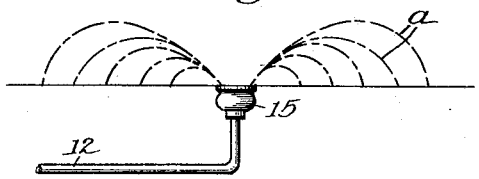
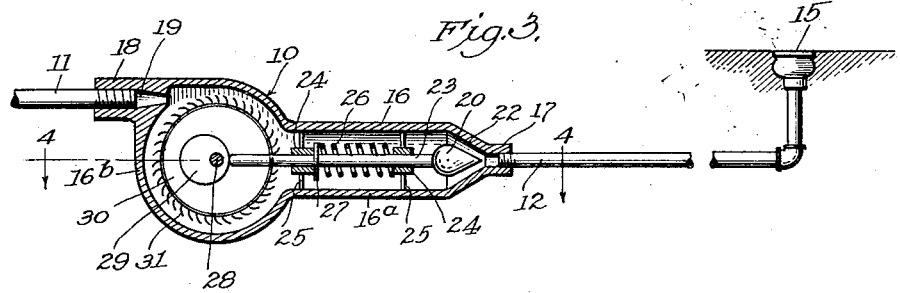
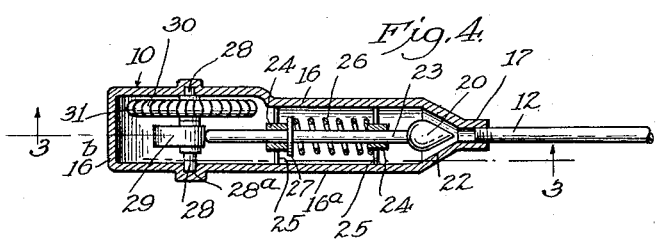
Inventor:
Francis M. Pottenger Jr.,
by
Attorney Patented Apr. 26, 1932

1,855,647

UNITED STATES PATENT OFFICE

FRANCIS M. POTTENGER, JR., OF MONROVIA, CALIFORNIA

SPRINKLING SYSTEM

Application filed May 31, 1928. Serial No. 281,625.

This invention pertains to sprinkling systems, for lawns or other vegetation, and is particularly applicable to systems in which sprinkler heads are utilized in fixed positions and arranged to sprinkle areas of definite size and shape. In its broader aspects it is similar to my invention shown and described in a co-pending application, filed May 31st, 1928, Serial No. 281,623, although in the instant case the specific means for accomplishing my purposes is different.

The principal object of my invention is to provide a means operable in connection with a water supply of definite head and pressure, whereby the pressure may be varied to effect the sprinkling of the entire areas.

I have conceived and perfected this invention particularly for use in connection with sprinkler heads like, or similar to, that shown and described in my co-pending application filed March 9th, 1923, Serial No. 623,960; however, it is to be understood that it may be utilized in connection with other types of sprinkler heads where applicable.

Sprinkler heads, like that shown in my aforesaid co-pending application, have been devised for sprinkling areas of definite size and shape and these have been found very effective; but in many cases they are primarily arranged for sprinkling only the outer portions of the areas without any particular regard for sprinkling the portions adjacent the sprinkler head except as this may be accomplished by the light spray or drops falling from the streams directed to the outer portions.

As it is always a desideratum to conserve water supply and minimize the amount used for sprinkling lawns and the like and at the same time provide an adequate irrigation, it is my foremost object to provide this means whereby an equal and adequate distribution of water over any particular area may be effectively accomplished with a minimum of waste. My present invention accomplishes this in a very efficient manner and is adaptable to all sprinkling or irrigating systems and may be adapted to water supplies of various heads and pressures.

The salient feature of my invention are more fully set forth in the following specification, reference being made therein to the accompanying drawings for purposes of illustration.

In these drawings:

Fig. 1 is a diagrammatic view showing the use of my invention in connection with a lawn sprinkling system;

Fig. 2 is a diagrammatic view illustrating how a variable current accomplishes the entire sprinkling of a definite area;

Fig. 3 is an enlarged sectional view through one form of mechanism I have designed for effecting a variable current in connection with a water supply of definite head and pressure, being taken as indicated by the line 3—3 of Fig. 4; and Fig. 4 is a sectional plan view taken as indicated by the line 4—4 of Fig. 3.

Referring now to these drawings the numeral 10 designates generally my improved variable control means, 11 a water supply pipe connected to the mechanism 10, and 12 a discharge or feed pipe connected, as by means of laterals 13 and 14, to any number of sprinkler heads 15.

While heads 15 of any type may be utilized in this system it may, for the purpose of disclosing the principles of my invention, be assumed that these are of a type similar to that shown in my aforementioned co-pending application for sprinkling areas of definite size and shape. With sprinkler heads of this type ordinarily the outer portions of the areas get the most water while those portions adjacent the sprinkler head get the least; consequently either the outer portions get too much water or the inner portions do not get enough, within a given period of time unless some means is devised for varying the force of the water supply and thereby altering the trajectories of the streams to throw them to points at different distances from the head. This I accomplish by the mechanism 10.

Referring now particularly to Figs. 3 and 4 the numeral 16 designates a water tight housing enclosing the mechanism for varying the current to the sprinkler heads 15. This is reduced at one end 17 for attachment to the discharge pipe 12, while the water supply pipe 11 connects to its opposite end, as at 18, and discharges water into the housing 16 through an inlet port 19, in the form of a nozzle. A needle valve 20, of conical configuration is mounted adjacent on outlet port 21 around which a conical seat 22 is formed; the latter conforming in angularity to the configuration of the valve 20. Valve 20 is rigidly mounted upon a stem 23 and this is mounted longitudinally slidable in the reduced portion 16a of the housing, in bearings 24. Preferably the reduced portion 16a of the housing will be substantially cylindrical and the valve mounted concentrically therein; the bearings 24 being supported upon spiders 25 designed to offer a minimum obstruction to the passages of the water therethrough.

The valve 20 is so mounted that it never entirely engages the seat 22 but always permits the passage of a small quantity of water so that the supply to the heads 15 is never entirely cut off and a quantity of water is always passing through the housing. Valve 20 is normally held in its unseated positions, or away from the seat 22, by the action of an expansile helical spring 26 confined between the forward spider 25 and a collar 27 on the stem 23. The rear spider 25 acts as a stop to limit movement of the valve stem to the left in Figs. 3 and 4.

A shaft 28 extends transversely across the large portion 16b of the housing, being revolubly supported in suitable bearings 28a formed therein. A cam 29 is rigidly mounted on shaft 28 for engagement with the inner end of valve stem 23 and the action of spring 26 normally holds this inner end in contact with the cam.

A water wheel 30, of any approved type, having peripheral vanes 31, is also rigidly mounted upon shaft 28 for rotating the latter and the cam 29. This is mounted in proper position in alignment with the nozzle 19 to be rotated by the water entering through pipe 11 under pressure.

In operation the water supply to the heads 15 is utilized, by the means described, for rotating the cam 29, and this, in combination with the spring 26, transmits to the valve 20 a reciprocating motion towards and away from the outlet port 21, which results in supplying a variable current to one or more of the heads 15 through the discharge pipe 12. As the valve 20 never entirely seats to close the outlet port 21 the water wheel 30 never entirely stops rotating as long as there is any water pressure in the supply pipe 11. However, as the valve 20 nears its seat 22 the velocity of water passing thrugh the housing 16 is lessened thereby lessening the amount delivered to the heads 15 and diminishing the speed of rotation of the wheel 30; consequently while there is less water being delivered to the heads 15 when the valve 20 nears its seat its period of flow is comparatively longer than when the outlet port 21 is full open. This results in a substantially even distribution of water over the entire area, as illustrated in Fig. 2. In that figure the lines A indicate diagrammatically the trajectories of the streams from the heads 15 to the outer portions of the areas, when the outlet port 21 is full open and the inner lines B indicate these trajectories falling successively closer to the head as this port is gradually closed. This, it is obvious, is due to the lessening of water supply and pressure delivered to the head, but, as stated above, due to the variable speed of action of the device the periods of time during which the water will fall upon different portions of the area, from their outer borders to points adjacent the heads, will be increased, while the water supply is correspondingly diminished, but these two substantially balance each other which results in a substantially even distribution of water over the entire area.

While I have herein shown and described the preferred specific embodiment of my invention it is nevertheless to be understood I reserve the right to make such other changes or modifications in construction and arangement as are permitted under the doctrine of equivalents and within the scope of the appended claims.

Having described a preferred form of my invention, I claim:

1. In a mechanism of the class described, the combination of a water tight housing, inlet and outlet ports in said housing, a valve for the outlet port, yielding means for normally holding said valve in open position, and means enclosed by the housing operable by the water passing through the housing for intermittently closing said valve.

2. In a mechanism of the class described, the combination of a water tight housing, inlet and outlet ports in said housing, a valve for the outlet port, yielding means for normally holding said valve in open position, cam means for closing said valve, and means actuated by water passing through the housing for continuously actuating said cam means to intermittently close said valve against the action of said spring.

3. In a mechanism of the class described, the combination of a water tight housing, inlet and outlet ports in said housing, a needle valve mounted adjacent the outlet port, means to prevent said valve from fully closing said outlet port, yielding means for normally holding said valve in its widest open position, a cam for moving said valve towards said outlet port, and a water wheel adjacent the inlet port adapted to be rotated by the force of the incoming water for rotating said cam.

4. In a mechanism of the class described, the combination of a water tight housing, inlet and outlet ports in said housing, a conical seat surrounding the outlet port, a needle valve mounted adjacent the outlet port, a valve stem mounted longitudinally slidable in the housing, yielding means to normally hold said valve in its widest open position and means to prevent its entirely closing the outlet port, a shaft mounted transversely of the housing, a cam on said shaft engaging the valve stem to intermittently move the valve towards the conical seat, a water wheel mounted on the shaft, said wheel being positioned adjacent the inlet port and adapted to be rotated by the force of the water entering therethrough.

5. In a mechanism of the class described, the combination of a water-tight housing, inlet and outlet ports in said housing, a valve for the outlet port, rotatable water-power actuated means in the housing, and operative means in connection with said water-power actuated means and valve whereby said valve is continuously reciprocated to open and close the outlet port.

6. In a mechanism of the class described, the combination of a water-tight housing, inlet and outlet ports in said housing, a valve for the outlet port, yielding means for normally holding said valve in open position, and means operated by the water while passing through the housing for intermittently closing said valve.

7. In a system for continuously conveying fluid from a source to a delivery point under pressure, mechanism to vary the rate of flow and pressure of the fluid at the delivery point, comprising: a fluid-tight housing in the system, inlet and outlet ports in said housing, a valve for the outlet port, yielding means to move the valve in one direction, and means to move the valve in the opposite direction, said means being actuated by the fluid passing to the delivery point and located upstream from the delivery point.

In witness that I claim the foregoing I have hereunto subscribed my name this 6th day of September, 1924.

FRANCIS M. POTTENGER, JR.